United States Patent [19]

Barth

[11] Patent Number: 4,490,082
[45] Date of Patent: Dec. 25, 1984

[54] FASTENER HAVING AN AXIALLY AND RADIALLY UNDULATING FLANGE

[75] Inventor: Gerald D. Barth, S. Elgin, Ill.

[73] Assignee: Illinois Tool Works Inc., Chicago, Ill.

[21] Appl. No.: 502,380

[22] Filed: Jun. 8, 1983

[51] Int. Cl.³ ............................................. F16B 31/02
[52] U.S. Cl. ................................. 411/185; 411/188; 411/332; 411/545
[58] Field of Search ..................... 411/9–11, 411/160–164, 184–189, 332, 411, 368, 369, 544, 545, 399, 400, 310, 311

[56] References Cited

U.S. PATENT DOCUMENTS

| | | | |
|---|---|---|---|
| 388,000 | 8/1888 | Rider | 411/399 |
| 1,825,419 | 9/1931 | Plym | 411/411 |
| 2,135,637 | 11/1938 | Gade | 411/311 |
| 2,289,066 | 7/1942 | Olson | 411/163 |
| 2,959,204 | 11/1960 | Rigot | 411/186 |
| 3,295,580 | 1/1967 | Waltermire | 411/187 |
| 3,661,046 | 5/1972 | Waud et al. | 411/369 |
| 3,812,639 | 5/1974 | Sygnator | 411/311 |
| 4,223,711 | 9/1980 | Tabor | 411/188 |
| 4,293,256 | 10/1981 | Pamer | 411/187 |

FOREIGN PATENT DOCUMENTS 138171 2/1920 United Kingdom ................ 411/544

Primary Examiner—Thomas J. Holko
Assistant Examiner—Neill Wilson
Attorney, Agent, or Firm—David I. Roche; T. W. Buckman

[57] ABSTRACT

A screw adapted for use with thin sheet metal. The screw has a threaded shank and a head with an integral flange. The flange has both radial and axial undulations which increase the amount of torque required to strip the screw. The undulations are formed at the outer edge of the flange and on the under surface of the flange and are adapted to engage a workpiece upon threaded advancement of the screw.

9 Claims, 4 Drawing Figures

FASTENER HAVING AN AXIALLY AND RADIALLY UNDULATING FLANGE

BACKGROUND AND SUMMARY OF THE INVENTION

The present invention relates to threaded fasteners and to sheet metal screws in particular. The invention is related to co-pending applications Ser. No. 426,459 filed Sept. 29, 1982 and Ser. No. 316,260 filed Oct. 29, 1981.

The present invention relates to the idea of increasing stripping torque. The use of thinner sheet metal in appliances and in automobiles has made screws more prone to stripping. The use of automatic driving equipment having settable clutching mechanisms makes it important to maximize the difference between the torque required to drive a screw and the torque at which the screw strips out the hole in the sheet metal. This is generally achieved by increasing the strip torque rather than by lowering drive torque.

The concept of increased strip torque should not be confused with the concept of increased removal torque or locking. While the two concepts may be related in that efforts to improve one may result in an improvement of the other, the concepts are sometimes diametrically opposed in that improvements to one may have to be made at a sacrifice to the other.

Frequently, increased strip torque and removal torque are achieved by forming sharp projections of one sort or another on the under surface of a screw. This has at least two drawbacks. First, damage to the surface of a workpiece may result, and secondly, such projections are difficult to manufacture because dies used wear quickly.

Accordingly, it is an object of the present invention to provide a screw which increases the strip torque of a sheet metal screw.

Another object is to provide a screw having greater strip torque and yet does minimal damage to the surface of a workpiece.

Another object is to provide a screw having increased strip torque which is simple to manufacture.

Another object is to provide a screw having increased strip torque and increased removal torque.

These and other objects and advantages are obtained with a screw having a head with an integral undulating flange. The flange is sloped so that variations in the radial configuration of the flange necessarily result in axial variations. Undulations caused by the radial and axial variations interfere with the surface of the workpiece and increase the amount of torque required to strip the screw. The inference is both axial and radial and yet causes a minimum of damage to the workpiece because the undulations are not abrupt.

The invention will be better understood upon a reading of the following specification, read in conjunction with the accompanying drawings.

DETAILED DESCRIPTION OF THE INVENTION

Figure 1:
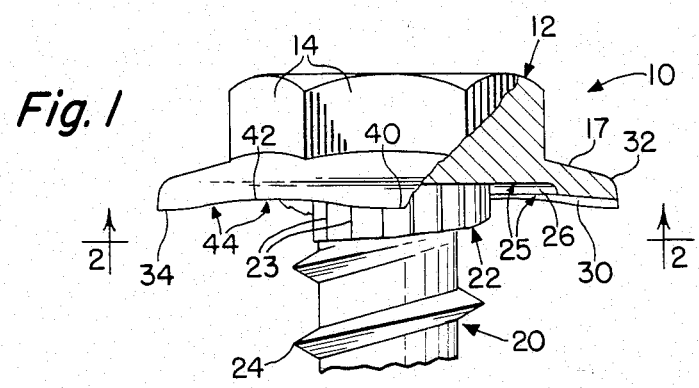
FIG. 1 is an elevational view in partial section of a screw embodying the present invention.
Figure 2:
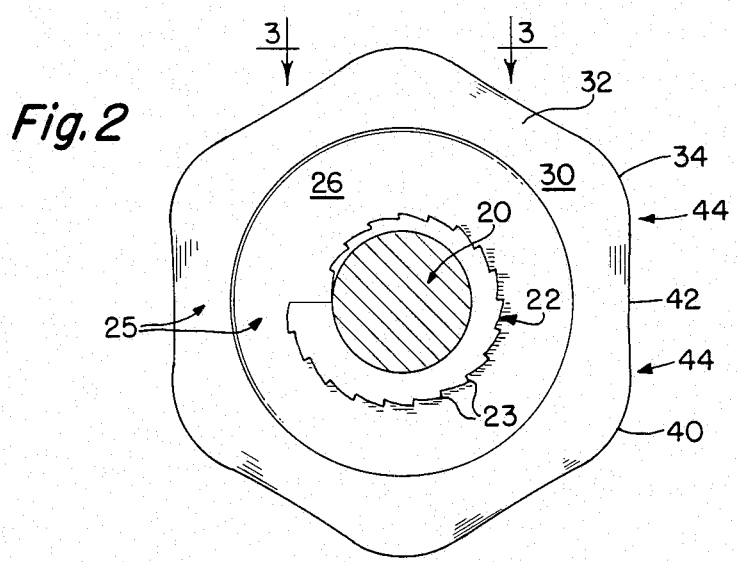
FIG. 2 is a sectional view taken along line II—II in FIG. 1.

A screw 10 embodying the present invention is shown generally in FIG. 1. The screw includes a head 12 comprised of wrenching surfaces 14 and a flange 17. The screw has a shank 20 depending from the head 12. A portion of the shank 20 has a helical ramp 22 with generally vertically disposed teeth 23. A thread 24 is helically disposed on the shank and extends substantially to the helical ramp 22, and the ramp 22 extends into a recess 26 formed in the undersurface 25 of the head 12. A second larger diameter shallow recess 30 is formed in the undersurface 25. The second recess 30 is formed by a sloping band 32 extending from the inner recess 26 to the outer edge 34 of the flange 17. Forming the band at a slope of about 10 degrees with respect to a plane perpendicular to the axis of the screw has been found to be successful. As can be seen in FIG. 2 the width of the band 32 varies and the overall diameter of the flange 17 may also vary depending upon the symmetry of the variations. No symmetry is required, however, in order for the invention to be effective. Peaks 40 and valleys 42 are formed in cold heading of the head 12. Because the band 32 is sloped the peaks 40 and the valleys 42 are formed both radially and axially. The peaks and valleys or undulations 44 are shown axially in FIG. 1 and radially in FIG. 2.

Figure 3:
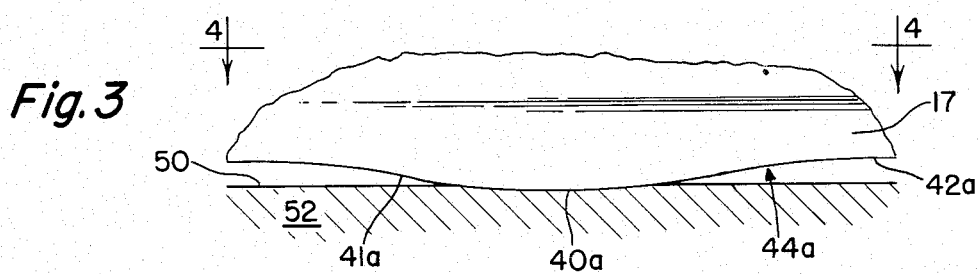
FIG. 3 is an enlarged elevational view taken along line III—III of FIG. 2.
Figure 4:
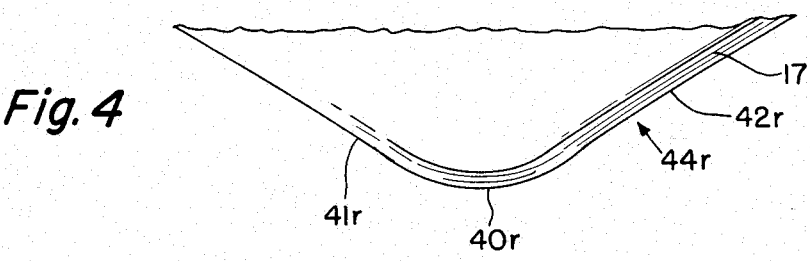
FIG. 4 is an enlarged plan view taken along line IV—IV of FIG. 3.

FIGS. 3 and 4 are enlarged views which show the effects of the undulations 44a and 44r. The small letter "a" following an identifying numeral designates "axial" and the small letter "r" following an identifying numeral designates radial. The leading side 41a of an axial peak 40a tends to interfere with the surface 50 of the workpiece 52. Similarly, the leading side 41r of the radial peak 40r interferes with the workpiece 52. The interference is such that torque required to turn the screw is increased.

The formation of undulations 44 in the manner described above has been found to enhance the stripping torque even when used together with the significant strip torque feature of the toothed helical ramp. The invention is also useful if the teeth 23 on the helical ramp are oriented in a manner to increase back-off or removal torque. Clearly, by increasing the extent to which a screw may be tightened, there is the result of increased removal torque. Therefore, the present invention not only makes installation of sheet metal screws easier when automatic tools are used, it also improves resistance to loosening because screws may be tightened to a higher torque.

The invention has been described with respect to certain perferred embodiments. It should be understood that numerous variations and modifications may be made without departing from the spirit and scope of the present invention.

I claim:

1. A screw comprising: a threaded shank, a head at one end of said shank adapted to accommodate a driving tool, said head including an integral flange, radial and axial undulations on said flange, said undulations creating non-abrupt variations in radial and axial profiles of said flange, said variations in axial profiles of said flange defining a recess in said head, said radial and axial undulations occurring with the radial outward peaks and the axial downward peaks at coincident locations on said flange, said undulations adapted to interfere with a workpiece upon threaded advancement of said screw into said workpiece, whereby torque required to strip said screw is increased.

2. A screw in accordance with claim 1 wherein said shank includes a helical ramp adjacent said head, said ramp having generally axially oriented teeth adapted to engage walls of an aperture in said workpiece.

3. A screw in accordance with claim 1 wherein said flange is generally beveled.

4. A screw in accordance with claim 1 wherein said head includes six wrenching flats which form a hexagonal configuration.

5. A screw in accordance with claim 1 wherein said undulations are evenly spaced about the perimeter of said flange.

6. A screw in accordance with claim 2 wherein said head includes a second recess smaller in diameter than said recess formed by said variations, said ramp extending into said second recess.

7. A screw in accordance with claim 1 wherein said head includes a second recess smaller in diameter than said recess formed by said variations.

8. A screw in accordance with claim 1 wherein said flange has an undersurface, said undersurface having an outer portion which lies at an angle of about 10 degrees with respect to a plane perpendicular to the axis of the screw.

9. A screw in accordance with claim 2 wherein said screw includes a helical thread disposed on said shank, said thread being adapted to engage said workpiece and advance said screw into said workpiece upon rotation of said screw in a first circumferential direction, said teeth being adapted to increase torque required to strip said screw, said teeth each being comprised of a generally radially oriented surface and a generally circumferentially oriented surface, said surfaces converging at a tooth edge, said radially oriented surfaces generally facing said first circumferential direction.

* * * * *